US006966947B2

(12) United States Patent
Furuya

(10) Patent No.: US 6,966,947 B2
(45) Date of Patent: Nov. 22, 2005

(54) CRYSTALLIZATION PROCESS AND APPARATUS THEREFOR

(75) Inventor: Takahisa Furuya, Okayama (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 212 days.

(21) Appl. No.: 10/380,059

(22) PCT Filed: Sep. 14, 2001

(86) PCT No.: PCT/JP01/08004
§ 371 (c)(1),
(2), (4) Date: Mar. 12, 2003

(87) PCT Pub. No.: WO02/28498
PCT Pub. Date: Apr. 11, 2002

(65) Prior Publication Data
US 2003/0180203 A1  Sep. 25, 2003

(30) Foreign Application Priority Data
Sep. 29, 2000  (JP)  .............................. 2000-299873

(51) Int. Cl.$^7$ ................................................ C30B 7/14
(52) U.S. Cl. ........................... 117/68; 117/69; 117/70; 422/245.1
(58) Field of Search ............................. 117/68, 69, 70; 422/245.1

(56) References Cited

U.S. PATENT DOCUMENTS 3,900,292 A    8/1975  Fairchild
4,781,899 A   11/1988  Rauh et al.
6,113,866 A *  9/2000  Lee et al. ................. 422/245.1
6,565,653 B2 * 5/2003  Wilsak .......................... 117/68
6,703,479 B1 * 3/2004  McGehee et al. ............ 528/503
6,719,954 B2 * 4/2004  Jansen ..................... 422/245.1

FOREIGN PATENT DOCUMENTS

EP       0 299 597      1/1989
JP       4-217947       8/1992

* cited by examiner

Primary Examiner—Robert Kunemund
(74) Attorney, Agent, or Firm—Antonelli, Terry, Stout and Kraus, LLP.

(57) ABSTRACT

A crystallization process comprising introducing a solution or a slurry formed by incomplete crystallization of a solute into a crystallization tank, crystallizing the solute in the crystallization tank, forming a slurry comprising crystals and a solvent and discharging the formed slurry to an outside, the crystallization being conducted, wherein a portion or an entire amount of the formed slurry is taken out of the crystallization tank and introduced into a crystal recycling apparatus, the crystals in the slurry are separated or the slurry is concentrated in the crystal recycling apparatus and the separated crystals or the concentrated slurry is recycled to the crystallization tank. Since the crystal recycling apparatus disposed and the crystallization is conducted while the separated crystals or the concentrated slurry is recycled from the crystal recycling apparatus to the crystallization tank, the residence time of the crystals and the concentration of the slurry in the crystallization tank can be increased. By controlling the flow rate of the recycled crystals, the distribution of the particle diameter can be improved and crystals having a desired average particle diameter can be obtained. Sticking of crystals to the liquid surface portions of the crystallization tank and apparatuses connected to the crystallization tank can be prevented.

9 Claims, 3 Drawing Sheets

CRYSTALLIZATION PROCESS AND APPARATUS THEREFOR

FIELD OF THE INVENTION

The present invention relates to a crystallization process and an apparatus therefor and, more particularly, to a crystallization process which can achieve, in the operation of crystallization, improving the average particle diameter and the distribution of the particle diameter and preventing sticking of crystals to the crystallization tank and apparatuses connected to the crystallization tank in simple procedures without complicated apparatuses.

BACKGROUND

In the fields of fertilizers such as ammonium sulfate fertilizers and urea fertilizers, various chemical products, pharmaceutical products and food products, various crystallization apparatuses are used for producing crystalline particles. From the standpoint of the type of heating, the crystallization apparatuses can be classified into crystallization apparatuses of the inner heating type and crystallization apparatuses of the outer heating type. From the standpoint of stirring, the crystallization apparatuses can be classified into crystallization apparatuses of the spontaneous stirring type using boiling of a liquid and crystallization apparatuses of the forced stirring type having stirring blades disposed inside the apparatuses.

It is important for every type of the crystallization apparatus that the average particle diameter and the distribution of the particle diameter of crystals are controlled and sticking of crystals to the wall surfaces of the crystallization apparatuses is prevented. Various attempts have been made to control the average particle diameter and the distribution of the particles diameter and to prevent sticking of crystals to the wall surfaces of the apparatuses.

In the crystallization apparatuses, the retention time of a slurry in the crystallization (the volume of a crystallization tank) is decided from the material balance and the time of crystallization necessary for growth of crystals (the residence time of crystals) when the condition of the crystallization is decided. When the average particle diameter or the distribution of the particle diameter as the target value is changed, the new target value must be achieved by a change in the retention time of a slurry during the crystallization within the range which the change in the liquid level in the crystallization tank allows or by changes in the temperature and the pressure of the crystallization. Naturally, the range of the change in the above conditions is restricted.

To overcome the above restriction, various attempts have been made for a long time. For example, a complicated structure is formed inside the crystallization tank. Typical examples of such structures include the crystallization tank of the Oslo type (Crystal Oslo) and the crystallization tank of the draft tube type. For example, in a process described in Japanese Patent Application Laid-Open No. Heisei 6(1994)-226003, an annular tube having many outlets for blowing a liquid is disposed at a lower end of an outer tube of a draft tube, an outer circulating apparatus is connected to the annular tube and a solution is supplied to a crystallization tank via the annular tube.

To prevent sticking of crystals, local measures are taken at portions where crystals stick and grow as described in the following.

1) To suppress sticking of crystals at liquid surface portions of an apparatus, the surface portions are treated by various polishing (buffing or electrolytic polishing) or coating with a material suppressing sticking (such as coating with Teflon).

2) To provide the solution in the vicinity of liquid surface portions of an apparatus with a property of preventing forming crystals, the solution in the vicinity of liquid surface portions of the apparatus is substituted or washed with a solution having a concentration lower than the saturation, heated or cooled.

3) To prevent growth of crystals even when crystals are stuck, the crystals are mechanically removed.(removed by scraping blades).

For example, in a process described in Japanese Patent Application Laid-Open No. Heisei 10(1998)-156103, a solvent is vaporized from a super saturated solution containing a crude material for crystallization under a reduced pressure while the solution is stirred by a stirrer having stirring shaft, the vaporized solvent is condensed at the outside of a crystallization tank and the condensed solvent is sprayed to the gas phase portion of the crystallization tank so that sticking of crystals at the gas phase portion of the crystallization tank is prevented.

As described above, various attempts have been made on the crystallization tank to improve the distribution of the particle diameter and prevent sticking of crystals to walls. However, in general, complicated apparatuses or operations are required and practical effects are not achieved in most cases. For example, in the process described in Japanese Patent Application Laid-Open No. Heisei 10(1998)-156103, the solvent obtained by the vaporization must be sprayed to the inside of the crystallization tank. The concentration of the material in the crystallization tank which is already concentrated is diluted again with the sprayed solvent and the efficiency of the concentration decreases. In the process described in Japanese Patent Application Laid-Open No. Heisei 6(1996)-226003, a complicated tube having outlets for blowing a liquid is required.

SUMMARY OF THE INVENTION

The present invention has an object of providing a process for improving the distribution of the particle diameter and preventing sticking of crystals to walls in simple procedures without complicated apparatuses.

As the result of extensive studies by the present inventors on the crystallization process and the crystallization apparatus to achieve the above object, it was found that, when the crystallization is conducted while a portion or the entire amount of the formed slurry is taken out of the crystallization tank and introduced into a crystal recycling apparatus, the crystals in the slurry are separated or the slurry is concentrated in the crystal recycling apparatus and the separated crystals or the concentrated slurry is recycled to the crystallization tank, the residence time of crystals in the crystallization tank and the concentration of the slurry could be increased, the distribution of the particle diameter was improved and crystals having a desired average particle diameter could be obtained by controlling the flow rate of the recycled crystals and sticking of crystals at the liquid surface portions in the crystallization tank and apparatuses connected to the crystallization tank is prevented. The present invention has been completed based on the knowledge.

The present invention provides a crystallization process comprising introducing a solution or a slurry formed by incomplete crystallization of a solute into a crystallization tank, crystallizing the solute in the crystallization tank, forming a slurry comprising crystals and a solvent and discharging the formed slurry to an outside, the crystallization being conducted, wherein a portion or an entire amount of the formed slurry is taken out of the crystallization tank and introduced into a crystal recycling apparatus, the crystals in the slurry are separated or the slurry is concentrated in the crystal recycling apparatus and the separated crystals or the concentrated slurry is recycled to the crystallization tank; and A crystallization apparatus for a crystallization process comprising introducing a solution or a slurry formed by incomplete crystallization of a solute into a crystallization tank, crystallizing the solute in the crystallization tank, forming a slurry comprising crystals and a solvent and discharging the formed slurry to an outside, the crystallization apparatus comprising a crystal recycling apparatus for separating the crystals in the formed slurry or concentrating the formed slurry and recycling the separated crystals or the concentrated slurry to the crystallization tank.

EXPLANATION OF THE MARK

Figure 1:
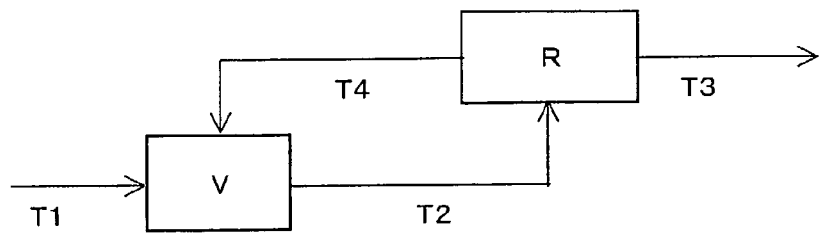
FIG. 1 shows a diagram exhibiting the principle of the present invention.

In the above figures, V means a crystallization tank, R, R1 and R2 each mean a crystal recycling apparatus, PP means a pump, A means a stirrer and C1 and C2 each mean an instrument for controlling the flow rate such as a control valve.

DETAILED DESCRIPTION OF THE PREFERRED EMBODIMENTS

The type of the crystallization tank used in the present invention is not particularly limited. A continuous crystallization tank is preferable. In general, the entire amount of the slurry formed in the crystallization tank is introduced into a crystal recycling apparatus via a pump for taking out crystals. Where necessary, a portion of the slurry formed in the crystallization tank may be taken out to the outside without passing through the crystal recycling apparatus.

The crystal recycling apparatus is constituted with either an apparatus for separating crystals in which the crystals are separated from the slurry taken out of the crystallization tank or an apparatus for concentrating a slurry in which the slurry containing the crystals and taken out of the crystallization tank is concentrated and an apparatus for transfer by which the separated crystals or the concentrated slurry is transferred to the crystallization tank for recycling. As the apparatus for separating crystals, any apparatus can be used as long as the apparatus can separate crystals from the slurry. As the apparatus for concentrating a slurry, any apparatus can be used as long as the apparatus can concentrate the slurry. For example, an inexpensive conventional apparatus such as a liquid cyclone, a gravity precipitation apparatus and a centrifugal precipitation apparatus can be used as the apparatus for concentrating a slurry.

The flow rate of the slurry formed in the crystallization tank and introduced into the crystal recycling apparatus is suitably decided in accordance with physical properties of the solute such as the solubility and physical properties of the slurry. By disposing the crystal recycling apparatus and recycling the crystals in accordance with the process of the present invention, the amount of the crystals in the crystallization tank can be increased in comparison with the amount without using the crystal recycling apparatus. The concentration of the slurry is several to several tens percent and it is occasionally possible that the concentration of the slurry is greater than several tens percent.

Since the concentration of the slurry in the crystallization tank can be increased to a desired value, advantages such as prevention of sticking of the crystals at the wall surface of the crystallization tank are exhibited. Moreover, substances which are not easily separated by crystallization in accordance with conventional processes due to a small change in the solubility depending on the temperature can occasionally be separated or cooling water can occasionally be used in a crystallization process which does not allow using cooling water heretofore.

In the present invention, in general, a control valve or a screw conveyor in which the rotation speed can be controlled is disposed and the distribution of the particle diameter can be changed and crystals having a desired average particle diameter can be obtained by changing the rotation speed of the control valve or the screw conveyor when the separated crystals or the concentrated slurry is recycled from the crystal recycling apparatus to the crystallization tank. Crystals having a high quality can be obtained by this operation. Moreover, the operations of separation of crystals and transfer of the separated crystals in the next step are facilitated and the efficiency of the operations can be improved.

In the present invention, for obtaining the sufficient effect of preventing sticking at the wall surface and improving the distribution of the particle diameter, it is important that the slurry in the crystallization tank is fluid and sufficiently mixed. In general, a crystallization tank having a stirrer inside the tank is used. Alternatively, the content of the crystallization tank may be fluidized, stirred and mixed not by stirring but by other operations such as supplying the concentrated slurry from the crystal recycling apparatus into the crystallization tank as a whirling stream or flashing a solution of the raw material into the crystallization tank at a high temperature.

The process of the present invention will be described with reference to figures in the following. FIG. 1 shows a diagram exhibiting the principle of the present invention. In FIG. 1, a raw material is introduced into a crystallization tank V via flow route T1. Crystals are formed in the crystallization tank V. The crystals formed in the crystallization tank are transferred as a slurry to a crystal recycling apparatus R via flow route T2. The crystals separated in the crystal recycling apparatus R or the slurry concentrated in the crystal recycling apparatus R is recycled to the crystallization apparatus V via flow route T4. Portions of the crystals introduced as the raw material and the crystals formed in the crystallization apparatus flow out of the crystal recycling apparatus via route T3 in amounts such that the content of the crystals in the crystal recycling apparatus is kept in a balance. The concentration of the slurry inside the crystallization apparatus V is increased by the recycled crystals.

As the material balance of the crystals, the sum of the flow rate S1 of the crystals in the raw material supplied via flow route T1 and the amount per unit time P of the crystals formed and grown in the crystallization tank V is equal to the flow rate S3 of the crystals going out via flow route T3. When the flow rate of the crystals recycled from the crystal recycling apparatus R to the crystallization apparatus V is represented by S4, the flow rate S2 of the crystals transferred via flow route T2 (the route from the crystallization tank V to the crystal recycling tank R) is expressed by (S3+S4).

When the amount of the crystals held inside the crystallization tank V in the absence of the flow of the crystals via flow route T4 is represented by H0, the amount H1 of the slurry held in the crystallization tank V in the presence of the flow of the crystals via flow route T4 in a flow rate of S4 is obtained as: $H1=H0 \times (S4+S3)/S3=H0 \times (S4+P+S1)/(P+S1)$.

As shown above, the residence time of the crystals in the crystallization tank V in the presence of the flow in the flow rate of S4 is increased by the factor of (H1/H0) from the residence time in the absence of the flow in the flow rate of S4. Therefore, the crystals can be grown and the average particle diameter can be increased.

Figure 2:
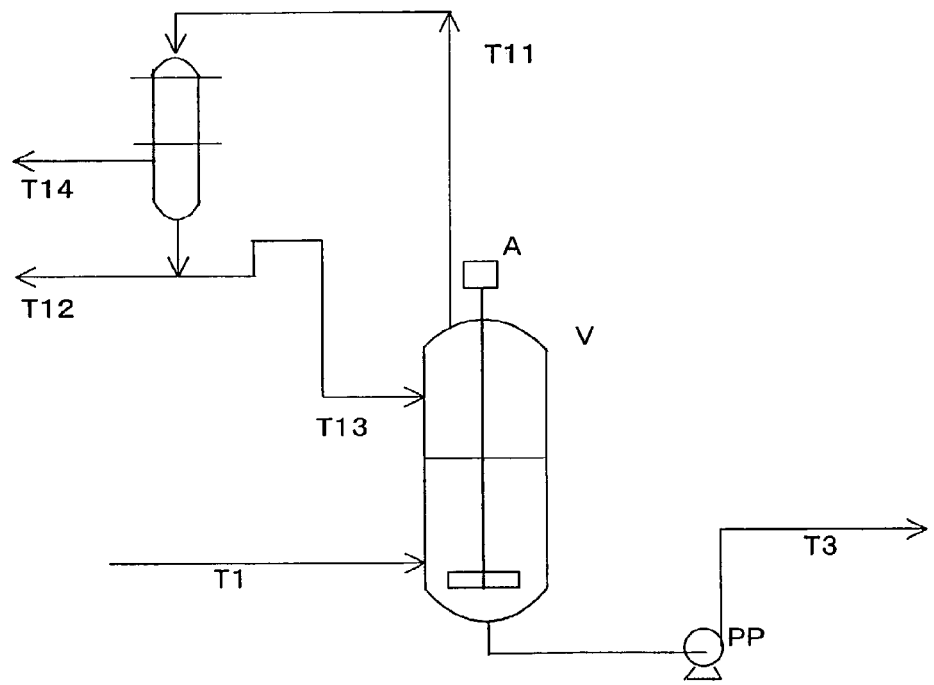
FIG. 2 shows a flow chart of a conventional apparatus in which the crystallization is conducted by flashing a slurry at a high temperature.
Figure 3:
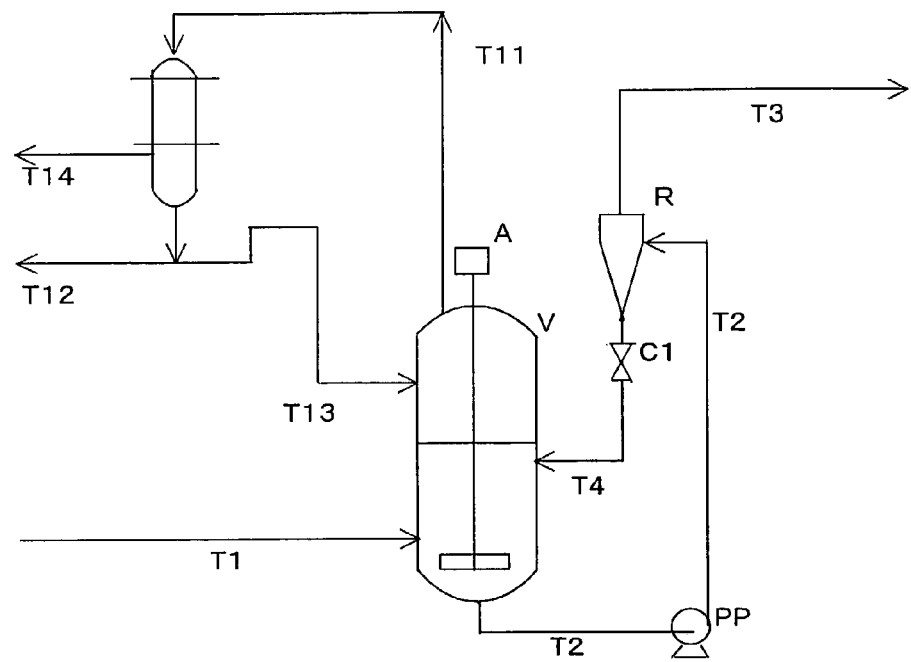
FIG. 3 shows a flow chart exhibiting the basic flow in the crystallization apparatus of the present invention comprising the apparatus shown in FIG. 2 and a crystal recycling apparatus.

FIG. 2 shows a flow chart of a conventional apparatus in which the crystallization is conducted by flashing a slurry at a high temperature. FIG. 3 shows a flow chart exhibiting the basic flow in the crystallization apparatus of the present invention comprising the apparatus shown in FIG. 2 and a crystal recycling apparatus.

In the flow chart shown in FIG. 3, a raw material slurry at a high temperature is introduced into a crystallization tank V via flow route T1. A stirrer A is disposed in the crystallization tank V. A slurry in the crystallization tank V is taken out by a pump PP via flow route T2. The entire amount of the slurry is introduced into a crystal recycling apparatus R (a liquid cyclone or the like apparatus) via flow route T2 and separated into a dilute slurry transferred via a route T3 and a concentrated slurry transferred via flow route T4. The crystals of the product are taken out as a slurry via flow route T3. The flow rate of the crystals recycled into the crystallization apparatus is controlled by a valve for controlling the flow rate disposed in flow route T4.

Figure 4:
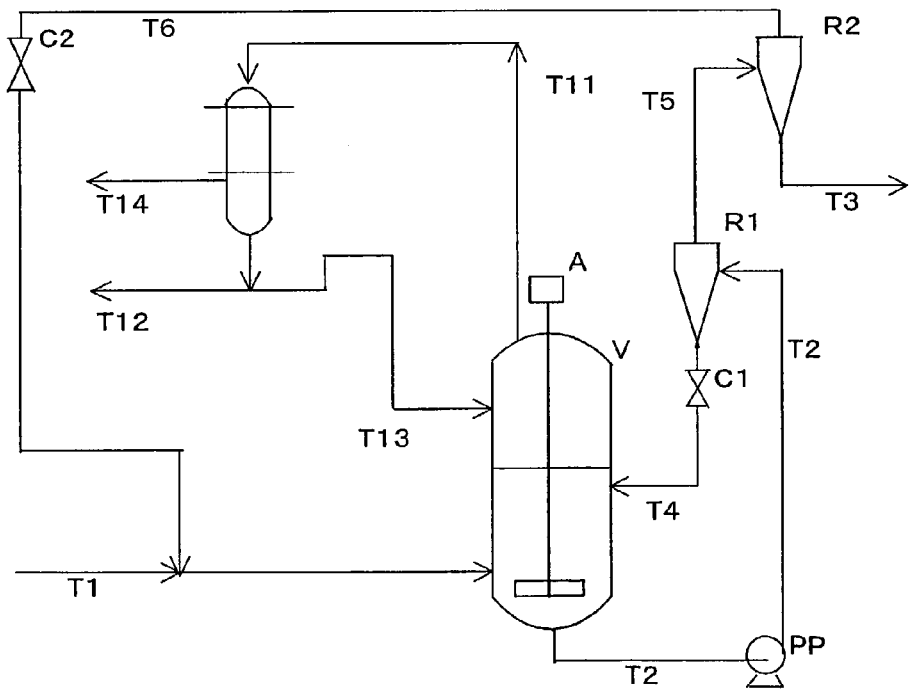
FIG. 4 shows a flow chart exhibiting an embodiment of the crystallization apparatus of the present invention comprising two crystal recycling apparatuses.
Figure 5:
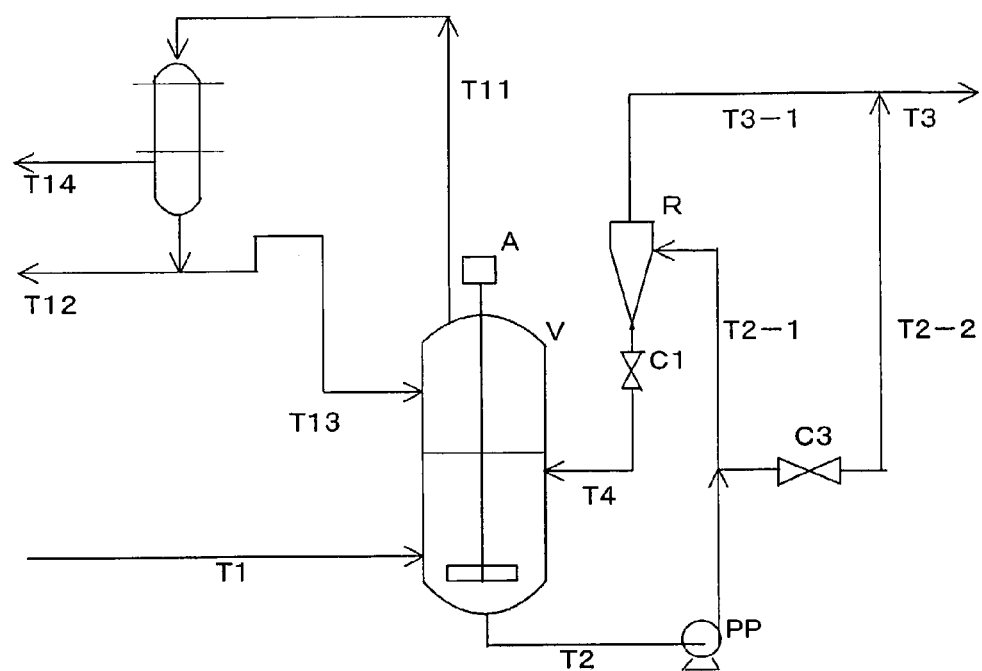
FIG. 5 shows a flow chart exhibiting another embodiment of the crystallization apparatus of the present invention in which a portion of a slurry taken out of the crystallization tank is not recycled to the crystallization tank but discharged to the outside.

In the present invention, various processes may be used for increasing the degree of concentration of the slurry and improving the distribution of the particle diameter. For example, the crystal recycling apparatuses may be used in two steps as shown in FIG. 4 or a portion of the slurry taken out of the crystallization tank may be taken out of the system without recycling into the crystal recycling apparatus as shown in FIG. 5.

In conventional crystallization apparatuses, a supersaturated solution is supplied to a crystallization apparatus, crystals are formed under cooling and stirring and a slurry containing the crystals is obtained.

In accordance with the process of the present invention, the concentration of the slurry in the crystallization apparatus is increased by the combination of the crystallization apparatus and the crystal recycling apparatus. As the result, the rate of crystallization per unit amount of the crystal can be kept small, and dense and hard crystals having an excellent purity can be obtained.

In accordance with the process of the present invention, since the concentration of the slurry in the crystallization tank can be increased, the rate of crystallization per unit amount of the crystal can be kept small even when the degree of supersaturation of the supersaturated solution supplied to the crystallization tank is kept great and the degree of supersaturation of the solution in the crystallization tank can be made small. Therefore, sticking of the crystals at the inside of the crystallization tank can be suppressed or prevented.

In the process of the present invention, when the slurry in the crystallization tank can be fluidized by stirring by a stirrer disposed in the crystallization tank, crystals stuck to the wall surfaces at the inside of the crystallization tank can be scraped off by the flow of the slurry having a high concentration. Thus, sticking of the crystals at the inside of the crystallization tank can be prevented or the growth of the crystals can be suppressed.

In the present invention, the residence time of the crystals and the residence time of the mother liquor in the crystallization tank can be independently controlled by the combined use of the crystallization tank and the crystal recycling apparatus. Therefore, the particle diameter in the slurry can be freely controlled and crystals having a desired particle diameter can be obtained. For controlling the particle diameter, a control valve for controlling the flow rate of the recycling of the concentrated slurry is used when an apparatus for concentrating a slurry is used as the crystal recycling apparatus and a screw conveyor for controlling the flow rate of the recycling of the crystals is used when an apparatus for separating crystals is used as the crystal recycling apparatus.

The process and the apparatus of the present invention can be applied, in principle, to any materials as long as the crystallization can be conducted. Therefore, the process and the apparatus of the present invention are advantageously used in wide industrial fields.

In the application of the process and the apparatus of the present invention, the concentration of the slurry in the crystallization tank can be increased by the combined use of the crystallization apparatus and the crystal recycling apparatus and the following advantageous effects are exhibited.

(1) The rate of crystallization per unit amount of the crystal can be suppressed to a small value and dense and hard crystals having a high purity can be obtained.

(2) The rate of crystallization per unit amount of the crystal can be suppressed to a small value even when the degree of supersaturation of the supersaturated solution supplied to the crystallization tank is kept at a great value and the degree of supersaturation of the solution in the crystallization tank can be kept at a small value. Therefore, sticking of crystals to the inside of the crystallization tank can be prevented and the growth of the crystals can be suppressed.

(3) When the slurry can be fluidized by stirring by a stirrer disposed in the crystallization tank, crystals stuck to the wall surface at the inside of the crystallization tank can be scraped off. Therefore, sticking of crystals to the inside of the crystallization tank can be prevented and the growth of the crystals can be suppressed.

(4) By using the combination of the crystallization tank and the crystal recycling apparatus and, further, by using the function of controlling the flow rate of the recycled crystals, the concentration of the slurry in the crystallization tank can be adjusted to a desired value and the residence time of the crystals and the residence time of the mother liquor in the crystallization tank can be changed independently. As the result, the particle diameter of the crystals can be adjusted as desired and crystals having a desired particle diameter can be obtained.

(5) As described above, since the physical properties (density, hardness and purity) of the crystals, the degree of supersaturation of the supersaturated solution supplied to the crystallization tank, the sticking of the crystals to the inside of the crystallization tank and the growth of the stuck crystals can be controlled as desired, the crystals having high quality can be obtained and the operations of separation and transfer of the crystals after the crystallization are facilitated.

(6) Since the concentration of the slurry in the crystallization tank can be increased, the crystallization can be conducted using cooling water at an elevated temperature of the crystallization even when the difference in the solubility depending on the temperature is so small that crystals obtained by crystallization have small diameters and cannot be separated in accordance with conventional processes or even when cooling with water is impossible since the effect of crystallization disappears unless the temperature of crystallization is lowered.

As described above, by the combined use of the crystallization tank and the crystal recycling apparatus, the improvement in the distribution of the particle diameter and the prevention of sticking of crystals to the wall surfaces can be achieved in accordance with simple operations without using complicated apparatuses. Therefore, the process and the apparatus of the present invention are industrially advantageous.

The present invention will be described more specifically with reference to examples in the following. However, the present invention is not limited to the examples.

EXAMPLE 1

Using the crystallization apparatus shown in FIG. 3, crystallization of pyromellitic acid from a solution of a crude pyromellitic acid was conducted. A liquid cyclone was used as the crystal recycling apparatus and a control valve was used for controlling the flow rate of the recycling of the concentrated slurry. A raw material solution (a solution of a crude pyromellitic acid) containing the crystal component (pyromellitic acid) at a high temperature was vaporized by flashing into an apparatus shown in FIG. 3 and a concentrated slurry was recycled from the crystal recycling apparatus to the crystallization tank at a flow rate 0.3 time the flow rate of the slurry taken out from the crystallization tank. As the result, the average particle diameter of the crystals was 80 µm and the ability of an apparatus for separation of crystals was improved.

COMPARATIVE EXAMPLE 1

The same procedures as those conducted in Example 1 were conducted except that the crystals taken out of the crystallization tanks was not supplied to the crystal recycling apparatus (the liquid cyclone) and the slurry in the crystallization apparatus was taken out of the system without recycling. As the result, the average particle diameter of the crystals was about 50 µm.

What is claimed is:
1. A crystallization process comprising:
(i) introducing a solution or a slurry formed by incomplete crystallization of a solute into a crystallization tank,
(ii) crystallizing the solute in the crystallization tank,
(iii) forming a slurry comprising crystals and a solvent, and
(iv) discharging the formed slurry to an outside,
wherein the crystallization is conducted while a portion or an entire amount of the formed slurry is taken out of the crystallization tank and introduced into a liquid cyclone, the slurry is concentrated in the liquid cyclone and the concentrated slurry is recycled to the crystallization tank.

2. A crystallization process according to claim 1, wherein the crystallization is conducted while a residence time of the crystals and a concentration of the slurry in the crystallization tank are controlled by controlling a flow rate of the concentrated slurry recycled from the liquid cyclone to the crystallization tank.

3. A crystallization apparatus for a crystallization process comprising introducing a solution or a slurry formed by incomplete crystallization of a solute into a crystallization tank, crystallizing the solute in the crystallization tank, forming a slurry comprising crystals and a solvent and discharging the formed slurry to an outside, the crystallization apparatus comprising:
(i) said crystallization tank; and
(ii) a liquid cyclone for concentrating the formed slurry and recycling the concentrated slurry to the crystallization tank; and
(iii) supply structure to recycle said concentrated slurry from said liquid cyclone to said crystallization tank.

4. A crystallization apparatus according to claim 3, further comprising a control valve which has a function of controlling a flow rate of the concentrated slurry recycled from the liquid cyclone to the crystallization tank.

5. A crystallization apparatus according to claim 3, which comprises at least two liquid cyclones connected in series and has a function of recycling the concentrated slurry from each liquid cyclone into the crystallization tank.

6. A crystallization process according to claim 1, wherein a sum of flow rate, of crystals in raw material supplied to the crystallization tank and amount per unit time of crystals formed and grown in the crystallization tank is equal to flow rate of crystal product removed from the liquid cyclone.

7. A crystallization process according to claim 1, wherein amount $H_1$, of slurry held in the crystallization tank during flow of recycled, concentrated slurry to the crystallization tank is $$H_1 = H_o \times (S_4 + P + S_1)/(P + S_1)$$

where $H_o$ is amount of crystals held inside the crystallization tank in the absence of recycled concentrated slurry, $S_4$ is the flow rate of crystals in the recycled concentrated slurry, and $S_1$ is flow rate of crystals of raw material supplied to the crystallization tank.

8. A crystallization process according to claim 1, wherein amount of crystals in the crystallization tank is increased with recycling of said concentrated slurry as compared with amount of crystals in the crystallization tank without recycling the concentrated slurry.

9. A crystallization process according to claim 1, wherein a dilute slurry is transferred from said liquid cyclone, said dilute slurry including crystals as product.

* * * * *